H. G. SEDGWICK.
AUTOMATIC TRAIN STOP.
APPLICATION FILED OCT. 28, 1907.
900,216.
Patented Oct. 6, 1908.
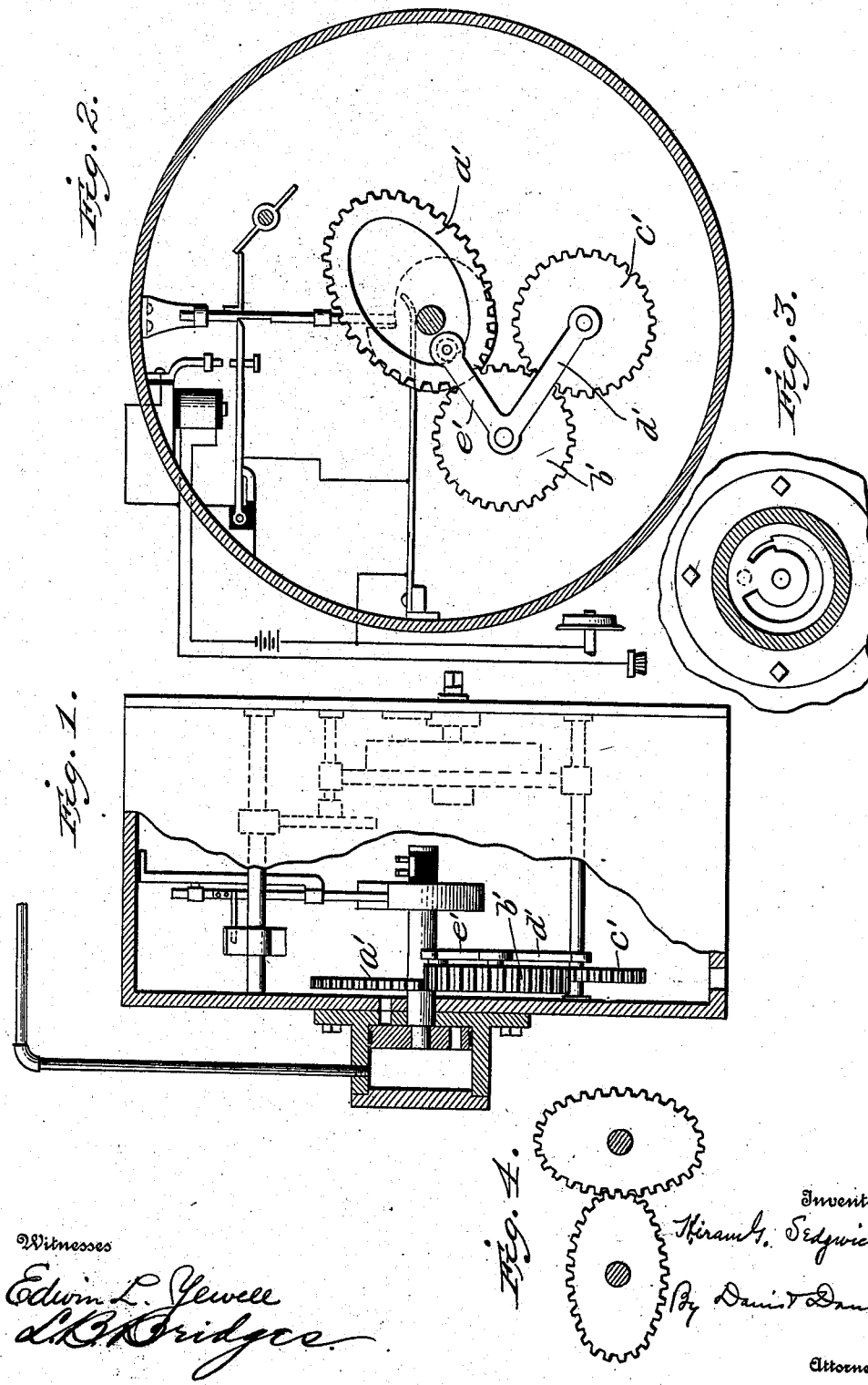

UNITED STATES PATENT OFFICE.

HIRAM G. SEDGWICK, OF MILL VALLEY, CALIFORNIA.

AUTOMATIC TRAIN-STOP.

No. 900,216.  Specification of Letters Patent.  Patented Oct. 6, 1908.

Application filed October 28, 1907. Serial No. 399,443.

*To all whom it may concern:*

Be it known that I, HIRAM G. SEDGWICK, a citizen of the United States of America, and resident of Mill Valley, county of Marin, State of California, have invented certain new and useful Improvements in Automatic Train-Stops, of which the following is a full and clear specification, reference being had to the accompanying drawing, in which—

Figure 1 a view partly in section and partly in side elevation of apparatus embodying one form of my invention; Fig. 2 a vertical section taken at right angles to Fig. 1, on the line 2—2; Fig. 3 a detail view of the valve; and Fig. 4 a detail view of another form of differential gearing.

The object of the present invention is to improve upon the mechanism shown in my copending application Serial Number 381,467, filed June 29, 1907, in which means are shown and described for preventing an emergency application of the brakes and at the same time insure a full and complete quick-action application of the brakes whatever be the length of the train with but a single operation or rotation of the vent valve. In that application the differential action of the valve is secured by means of a friction brake appliance and the specific devices shown provide for a quick initial movement of the valve followed by a slowing down of the valve so as to provide for applying the brakes in a manner as nearly as possible similar to a perfect manual application of the brakes through the medium of the engineer's control valve, thus avoiding the injurious consequences to the rolling stock of an emergency application of the brakes.

The present invention provides for obtaining the desired differential action of the valve through the medium of positively driven cog gears so as to increase the certainty and positiveness of the valve action, as more fully hereinafter set forth.

I have shown the present improvement applied to the same mechanism for opening the valve shown and described in my aforesaid application and I therefore do not deem a detailed description thereof in this case to be necessary. I do away in this application with the brake lever and the operating cam thereof and also the large cog gear on the valve shaft. In place of this large cog gear I employ a suitable gear $a'$ which may be elliptical or other irregular shape as shown in Fig. 4 or may be regular or circular in shape and set eccentrically on the shaft as shown in Figs. 1 and 2. As shown in Figs. 1 and 2, when the gear is eccentrically set on the shaft I employ a floating pinion $b'$ for driving it, this floating pinion being driven by a suitable gear $c'$ on one of the shafts of the clockwork motor. This floating pinion $b'$ is swung on the shaft of gear $c'$ by means of a suitable link $d'$, and to keep it in constant mesh with the differential gear $a'$ it may be pressed up against the same by a spring or hung to the gear by means of a hanger arm $e'$ carrying a roller at its end which engages an internal flange or shoulder on the differential gear.

With the construction shown in Figs. 1 and 2 it will be observed that by reason of the eccentricity of the gear $a'$ the initial movement of the valve shaft will be a quick one and that the movement will gradually slow down until the gear has made a half turn when the movement will then be gradually accelerated until the gear has made a full turn. In this way any desired differential movement of the valve may be secured, so as to adapt the movement to the shape and length of the vent port in the valve. The shape of the differential gear may be varied indefinitely as practical conditions may require. For the valve ports of the shape shown it is desirable that a quick initial movement be given which shall be followed by a slowing down of the valve in order that by the time the valve has made a full turn a full application of the brakes will be secured even though the train be an unusually long one. Substantially the same movement may be obtained by means of the elliptical gears shown in Fig. 4 and as is obvious other suitable arrangements may be designed for giving the valve shaft the desired differential movement.

Having thus fully described by invention, what I claim and desire to secure by Letters Patent is:—

1. In combination with a train-pipe of an air-brake system, of a vent valve therefor having an elongated port, a motor mechanism for actuating the valve a full stroke with each actuation and then stopping it, said mechanism embodying positively geared mechanism for imparting to the valve a quick movement during a part of its stroke and a slower movement during another part of its stroke, for the purpose set forth.

2. In an automatic train-stopping mechanism, a vent for the train-pipe embodying a rotary valve having an elongated port, a motor mechanism for actuating the valve a single stroke and then stopping it embodying positive differential gearing for imparting a differential movement to the valve, for the purpose set forth.

In testimony whereof I hereunto affix my signature in the presence of two witnesses this 11th day of October 1907.

HIRAM G. SEDGWICK.

Witnesses:
S. H. ROBERTS,
HENRIETTA ROBERTS.